US008843362B2

(12) United States Patent
Danielson

(10) Patent No.: US 8,843,362 B2
(45) Date of Patent: Sep. 23, 2014

(54) SYSTEM AND METHOD FOR SENTIMENT ANALYSIS

(75) Inventor: Debra Jean Danielson, Somerset, NJ (US)

(73) Assignee: CA, Inc., Islandia, NY (US)

( * ) Notice: Subject to any disclaimer, the term of this patent is extended or adjusted under 35 U.S.C. 154(b) by 824 days.

(21) Appl. No.: 12/639,153

(22) Filed: Dec. 16, 2009

(65) Prior Publication Data
US 2011/0144971 A1 Jun. 16, 2011

(51) Int. Cl.
G06F 17/27 (2006.01)
G10L 15/00 (2013.01)
G10L 15/18 (2013.01)
G10L 17/00 (2013.01)
G06F 3/01 (2006.01)
G06Q 30/02 (2012.01)

(52) U.S. Cl.
CPC .......... *G06F 3/011* (2013.01); *G06F 2203/011* (2013.01); *G06Q 30/02* (2013.01); *G06F 17/2785* (2013.01); *G06F 17/2715* (2013.01)
USPC ................................ 704/9; 704/257; 704/246

(58) Field of Classification Search
USPC ................................ 704/1, 9, 231, 270.1, 276
See application file for complete search history.

(56) References Cited

U.S. PATENT DOCUMENTS 7,130,777 B2 * 10/2006 Garg et al. ........................ 703/2
7,249,312 B2 * 7/2007 Jasper et al. .................. 715/205
2003/0147522 A1 * 8/2003 Elazar ...................... 379/265.06
2006/0009966 A1 * 1/2006 Johnson et al. ................. 704/10
2006/0053156 A1 * 3/2006 Kaushansky et al. ......... 707/102
2006/0161543 A1 * 7/2006 Feng et al. ........................ 707/5
2007/0073704 A1 * 3/2007 Bowden et al. ................. 707/10
2008/0052080 A1 * 2/2008 Narayanan .................... 704/270

OTHER PUBLICATIONS

Hu et al. "Mining and Summarizing Customer Reviews". ACM KDD '04, Seattle, Washington.*
Dave et al. "Mining the Peanut Gallery: Opinion Extraction and Semantic Classification of Product Reviews." ACM WWW2003, Budapest, Hungary.*

* cited by examiner

*Primary Examiner* — Jesse Pullias
(74) *Attorney, Agent, or Firm* — Schwegman Lundberg & Woessner, P.A.

(57) ABSTRACT

A system includes one or more computer processors that are configured to receive data relating to a composition of a target group, receive logged communications of the target group, extract textual information from the logged communications, analyze the textual information using statistical and linguistic sentiment analysis techniques, identify an individual or sub-group from the target group as a function of the analysis of the textual information, and display on a user interface or transmit to another processor the identified individual or sub-group of the target group and to display on the user interface or transmit to another processor a sentiment assessment of the identified individual or sub-group as a function of the statistical and linguistic sentiment analysis.

24 Claims, 2 Drawing Sheets

SYSTEM AND METHOD FOR SENTIMENT ANALYSIS

FIELD OF THE INVENTION

The present disclosure relates to a system and method for sentiment analysis.

BACKGROUND

Traditionally, when a business or organization wanted to gauge the sentiments of a group of customers or other persons, the organization would take a survey of the group. However, conducting a proper survey is resource intensive, and consequently not at all inexpensive. Moreover, survey use can be limited by practicality and policy. For example, many organizations prohibit its use or permit only a limited use so as to prevent annoyance to its people. Even if not limited however, survey overuse can reduce the accuracy and usefulness of each survey as the survey participants reach overload. Additionally, survey participants may be disinclined to report true results and may skew or inflate responses.

To address the shortcomings of surveying systems, sentiment assessment systems have been proposed to scan and analyze newsfeeds and blogs. However, there is little analysis in such systems beyond determining an overall trend of the content of the newsfeed or blog.

The approaches described in this background section could be pursued, but are not necessarily approaches that have been previously conceived or pursued. Therefore, unless otherwise indicated herein, the approaches described in this background section are not prior art to the claims in this application and are not admitted to be prior art by inclusion in this background section.

SUMMARY

A system comprises one or more computer processors that are configured to execute a sentiment analysis from recorded or unrecorded communications. Specifically, the one or more computer processors receive data relating to a composition of a target group, receive logged communications of the target group, extract textual information from the logged communications, analyze the textual information using statistical and linguistic sentiment analysis techniques, identify an individual or sub-group from the target group as a function of the analysis of the textual information, and display on a user interface or transmit to another processor the identified individual or sub-group of the target group and display on the user interface or transmit to another processor a sentiment assessment of the identified individual or sub-group as a function of the statistical and linguistic sentiment analysis.

DETAILED DESCRIPTION

Figure 1:
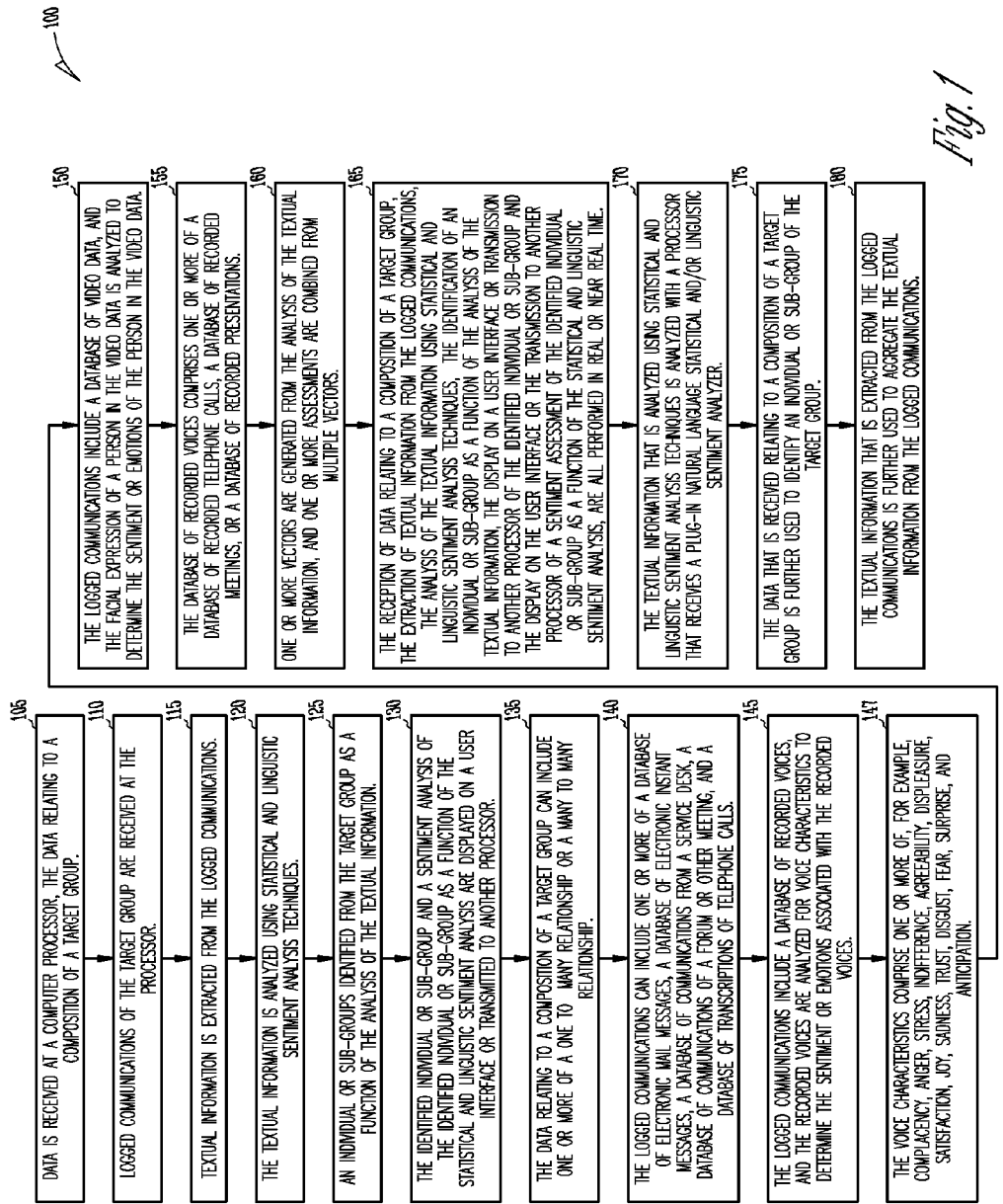
FIG. 1 is a flowchart of an example embodiment of a process to perform sentiment analysis.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). Consequently, a machine-readable medium can be either tangible or intangible in nature.

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 is a flowchart of an example process 100 for executing a sentiment analysis. FIG. 1 includes a number of process blocks 105-180. Though arranged serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to the process 100 of FIG. 1, at 105, data is received at a computer processor, the data relating to a composition of a target group. At 110, logged communications of the target group are received at the processor. At 115, textual information is extracted from the logged communications. At 120, the textual information is analyzed using statistical and linguistic sentiment analysis techniques. Such techniques can be also be applied to audio data and video data. For example, for audio data, the volume, tone, speed, and other factors of the audio data can be analyzed in a sentiment analysis. Word recognition software can also be used to determine the words that are used in a sample of audio data, and determine therefrom the sentiment reflected in the audio data. Similarly, text data can be analyzed for word content to determine the sentiment exhibited by the text data. For video data, computer vision techniques can be used to identify facial expressions that are associated with a particular sentiment, such as a wrinkled forehead exhibiting displeasure, disbelief, or suspicion. At 125, an individual or sub-group is identified from the target group as a function of the analysis of the textual information. At 130, the identified individual or sub-group and a sentiment analysis of the identified individual or sub-group as a function of the statistical and linguistic sentiment analysis are displayed on a user interface or transmitted to another processor. In an embodiment, the sentiment analysis process could be provided as a web service.

As noted at 135, the data relating to a composition of a target group can include one or more of a one to many relationship or a many to many relationship. For example, a business may want to examine and study the communications between a single customer and many employees, or examine and study the communications between many customers and many employees. At 140, the logged communications can include one or more of a database of electronic mail messages, a database of electronic instant messages, a database of communications from a service desk, a database of communications of a forum or other meeting, and a database of transcriptions of telephone calls. The database of forum communications can include traditional forums involving the physical gathering of many persons. The forum can also include electronic forums such as webinars, and further can include virtual forums like that of Second Life or LiveMeeting. In addition to the transcription of telephone calls, such transcriptions can include in a broader sense the transcription of any form of audio, including output from voice recognition algorithms. Additionally, the telephone calls can include transmission of audio data over a distance via any wired or wireless means, and further can include VoIP communication protocols such as Skype.

At 145, the logged communications include a database of recorded voices, and the process 100 analyzes the one or more recorded voices for voice characteristics to determine the sentiment or emotions associated with the recorded voices. At 147, the voice characteristics comprise one or more of, for example, complacency, anger, stress, indifference, agreeability, displeasure, satisfaction, joy, sadness, trust, disgust, fear, surprise, and anticipation. At 150, the logged communications include a database of video data, and the process 100 uses computer vision technology to analyze a facial expression of a person in the video data to determine the sentiment or emotions of the person in the video data. At 155, the database of recorded voices comprises one or more of a database of recorded telephone calls, a database of recorded meetings, or a database of recorded presentations.

At 160, one or more vectors are generated from the analysis of the textual information, and one or more assessments are combined from multiple vectors.

At 165, the reception of data relating to a composition of a target group, the extraction of textual information from the logged communications, the analysis of the textual information using statistical and linguistic sentiment analysis techniques, the identification of an individual or sub-group as a function of the analysis of the textual information, the display on a user interface or transmission to another processor of the identified individual or sub-group and the display on the user interface or the transmission to another processor of a sentiment assessment of the identified individual or sub-group as a function of the statistical and linguistic sentiment analysis, are all performed in real or near real time.

At 170, the textual information that is analyzed using statistical and linguistic sentiment analysis techniques is analyzed with a processor that receives a plug-in natural language statistical and/or linguistic sentiment analyzer. At 175, the data that is received relating to a composition of a target group is further used to identify an individual or sub-group of the target group. The data for an individual can be analyzed over time, so that the changing sentiment of the individual can be determined over time. At 180, the textual information that is extracted from the logged communications is further used to aggregate the textual information from the logged communications.

Figure 2:
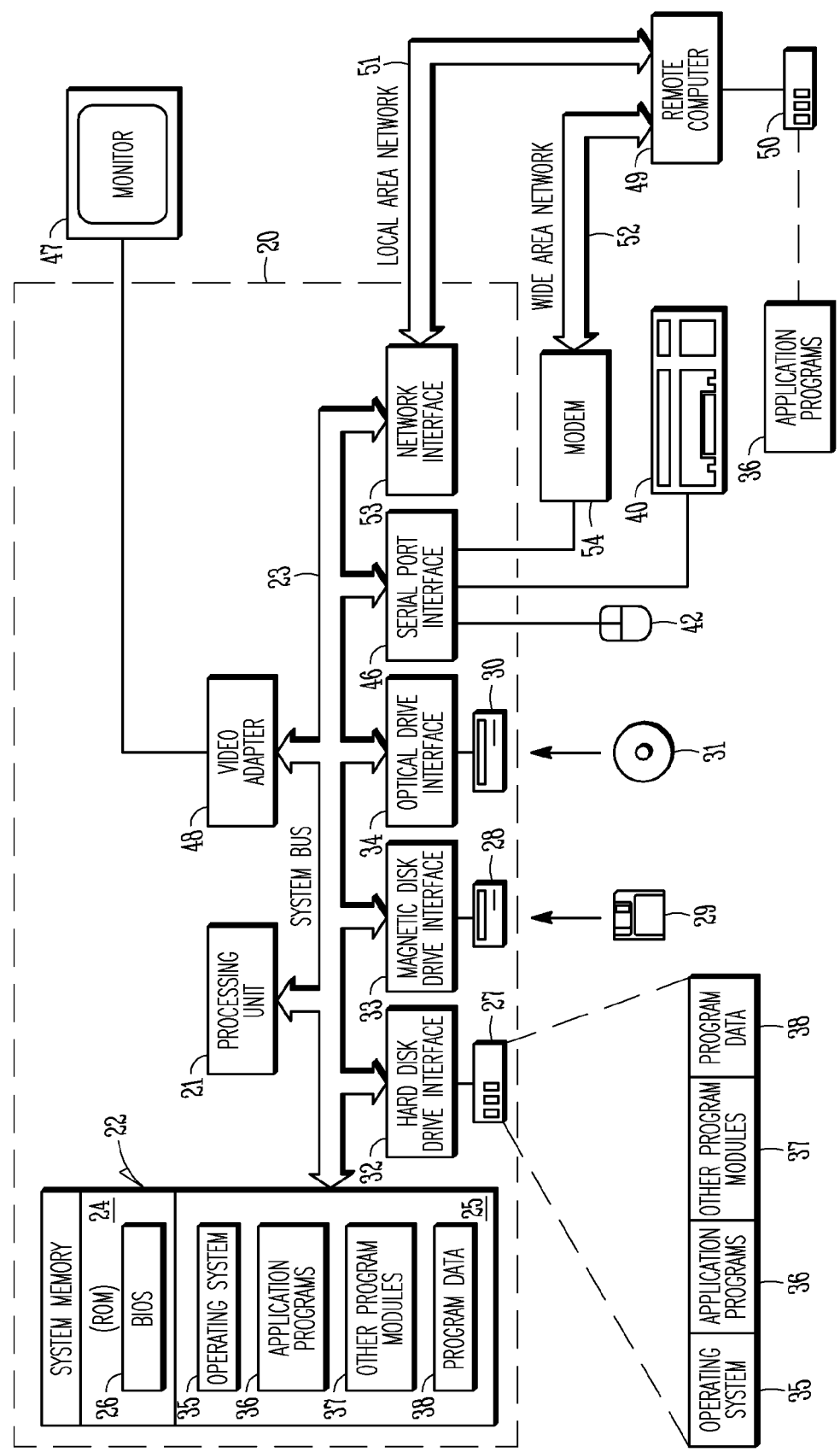
FIG. 2 is a block diagram of an example embodiment of a computer system upon which one or more embodiments of the present disclosure can execute.

FIG. 2 is an overview diagram of a hardware and operating environment in conjunction with which embodiments of the invention may be practiced. The description of FIG. 2 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 2, a hardware and operating environment is provided that is applicable to any of the servers and/or remote clients shown in the other Figures.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 2 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for a sentiment analysis has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Example Embodiments

In Example 1, a system comprises one or more computer processors configured to receive data relating to a composition of a target group; receive logged communications of the target group; extract textual information from the logged communications; analyze the textual information using statistical and linguistic sentiment analysis techniques; identify an individual or sub-group from the target group as a function of the analysis of the textual information; and display on a user interface or transmit to another processor the identified individual or sub-group of the target group and display on the user interface or transmit to another processor a sentiment assessment of the identified individual or sub-group as a function of the statistical and linguistic sentiment analysis.

In Example 2, a system optionally includes the features of Example 1, and further optionally includes a feature wherein the data relating to a composition of a target group comprises one or more of a one to many relationship or a many to many relationship.

In Example 3, a system optionally includes any of the features of Examples 1-2, and further optionally includes a feature wherein the logged communications comprise one or more of a database of electronic mail messages, a database of electronic instant messages, a database of communications from a service desk, a database of communications of a forum or other meeting, and a database of transcriptions of telephone calls.

In Example 4, a system optionally includes any of the features of Examples 1-3, and further optionally includes a feature wherein the logged communications comprises a database of recorded voices; and wherein the system comprises a processor configured to analyze the one or more recorded voices for voice characteristics.

In Example 5, a system optionally includes any of the features of Examples 1-4, and further optionally includes a feature wherein the logged communications include a database of video data, and wherein the system comprises a processor configured to analyze a facial expression of a person in the video data.

In Example 6, a system optionally includes any of the features of Examples 1-5, and further optionally includes a feature of wherein the voice characteristics comprise one or more of, for example, complacency, anger, stress, indifference, agreeability, displeasure, satisfaction, joy, sadness, trust, disgust, fear, surprise, and anticipation.

In Example 7, a system optionally includes any of the features of Examples 1-6, and further optionally includes a feature of wherein the database of recorded voices comprises one or more of a database of recorded telephone calls, a database of recorded meetings, or a database of recorded presentations.

In Example 8, a system optionally includes any of the features of Examples 1-7, and further optionally includes a feature of wherein the one or more processors are configured to generate one or more vectors from the analysis of the textual information, and combine one or more assessments from multiple vectors.

In Example 9, a system optionally includes any of the features of Examples 1-8, and further optionally includes a feature of wherein the one or more processors configured to receive data relating to a composition of a target group, extract textual information from the logged communications, analyze the textual information using statistical and linguistic sentiment analysis techniques, identify an individual or sub-group as a function of the analysis of the textual information, display on a user interface or transmit to another processor the identified individual or sub-group and display on the user interface or transmit to another processor a sentiment assessment of the identified individual or sub-group as a function of the statistical and linguistic sentiment analysis, are further configured to execute and process the data, textual information, and the display in real or near real time.

In Example 10, a system optionally includes any of the features of Examples 1-9, and further optionally includes a feature of wherein the one or more processors configured to analyze the textual information using statistical and linguistic sentiment analysis techniques are configured to receive a plug-in natural language statistical and/or linguistic sentiment analyzer.

In Example 11, a system optionally includes any of the features of Examples 1-10, and further optionally includes a feature of wherein the one or more processors configured to receive data relating to a composition of a target group are further configured to identify an individual or sub-group of the target group.

In Example 12, a system optionally includes any of the features of Examples 1-11, and further optionally includes a feature of wherein the one or more processors are further configured to analyze the sentiment of the individual or sub-group over a period of time.

In Example 13, a system optionally includes any of the features of Examples 1-12, and further optionally includes a feature of wherein the one or more processors configured to extract textual information from the logged communications are further configured to aggregate the textual information from the logged communications.

In Example 14, a computerized process comprises receiving at a computer processor data relating to a composition of a target group; receiving at the computer processor logged communications of the target group; extracting with the computer processor textual information from the logged communications; analyzing with the computer processor the textual information using statistical and linguistic sentiment analysis techniques; identifying with the computer processor an individual or sub-group from the target group as a function of the analysis of the textual information; and displaying on a user interface or transmitting to another processor the identified individual or sub-group of the target group and displaying on the user interface or transmitting to another processor a sentiment assessment of the identified individual or sub-group as a function of the statistical and linguistic sentiment analysis.

In Example 15, a computerized process optionally includes any of the features of Example 14, and further optionally includes a feature of wherein the data relating to a composition of a target group comprises one or more of a one to many relationship or a many to many relationship.

In Example 16, a computerized process optionally includes any of the features of Examples 14-15, and further optionally includes a feature of wherein the logged communications comprise one or more of a database of electronic mail messages, a database of electronic instant messages, a database of communications from a service desk, a database of communications of a forum or other meeting, and a database of transcriptions of telephone calls.

In Example 17, a computerized process optionally includes any of the features of Examples 14-16, and further optionally includes a feature of wherein the logged communications comprise a database of recorded voices; and wherein the system comprises a processor configured to analyze the one or more recorded voices for voice characteristics.

In Example 18, a computerized process optionally includes any of the features of Examples 14-17, and further optionally includes a feature of wherein the voice characteristics comprise one or more of, for example, complacency, anger, stress, indifference, agreeability, displeasure, satisfaction, joy, sadness, trust, disgust, fear, surprise, and anticipation.

In Example 19, a computerized process optionally includes any of the features of Examples 14-18, and further optionally includes a feature of wherein the database of recorded voices comprises one or more of a database of recorded telephone calls, a database of recorded meetings, or a database of recorded presentations.

In Example 20, a computerized process optionally includes any of the features of Examples 14-19, and further optionally includes a feature of wherein the logged communications include a database of video data, and comprising analyzing a facial expression of a person in the video data In Example 21, a computerized process optionally includes any of the features of Examples 14-20, and further optionally includes a feature of generating with the computer processor one or more vectors from the analysis of the textual information, and combining with the computer processor one or more assessments from multiple vectors.

In Example 22, a computerized process optionally includes any of the features of Examples 14-21, and further optionally includes a feature of wherein the receiving data relating to a composition of a target group, extracting textual information from the logged communications, analyzing the textual information using statistical and linguistic sentiment analysis techniques, identifying an individual or sub-group as a function of the analysis of the textual information, displaying on a user interface or transmitting to another processor the identified individual or sub-group and displaying on the user interface or transmitting to another processor a sentiment assessment of the identified individual or sub-group as a function of the statistical and linguistic sentiment analysis, are further supplemented by executing and processing the data, textual information, and the display in real or near real time.

In Example 23, a computerized process optionally includes any of the features of Examples 14-22, and further optionally includes a feature of wherein the analyzing the textual information using statistical and linguistic sentiment analysis techniques is performed in connection with receiving a plug-in natural language statistical and/or linguistic sentiment analyzer.

In Example 24, a computerized process optionally includes any of the features of Examples 14-23, and further optionally includes a feature of wherein the data relating to a composition of a target group are further used to identify an individual or sub-group of the target group.

In Example 25, a computerized process optionally includes any of the features of Examples 14-24, and further optionally includes a feature of aggregating the textual information from the logged communications.

In Example 26, a tangible machine-readable medium storing instructions, which, when executed by a processor, cause the processor to perform a process comprising receiving data relating to a composition of a target group; receiving logged communications of the target group; extracting textual information from the logged communications; analyzing the textual information using statistical and linguistic sentiment analysis techniques; identifying an individual or sub-group from the target group as a function of the analysis of the textual information; and displaying on a user interface or transmitting to another processor the identified individual or sub-group of the target group and displaying on the user interface or transmitting to another processor a sentiment assessment of the identified individual or sub-group as a function of the statistical and linguistic sentiment analysis.

In Example 27, a tangible machine readable medium optionally includes any of the features of Example 26, and further optionally includes a feature of wherein the logged communications comprise a database of recorded voices, and comprising analyzing the one or more recorded voices for voice characteristics.

In Example 28, a tangible machine readable medium optionally includes any of the features of Examples 26-27, and further optionally includes a feature of wherein the logged communications include a database of video data, and comprising analyzing a facial expression of a person in the video data.

In Example 29, a tangible machine readable medium optionally includes any of the features of Examples 26-28, and further optionally includes a feature of instructions to perform a process comprising generating one or more vectors from the analysis of the textual information, and combining one or more assessments from multiple vectors.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
one or more computer processors configured to:
receive data relating to a composition of a target group;
receive logged communications of the target group;
extract textual information from the logged communications;
analyze the textual information using statistical and linguistic sentiment analysis techniques;
generate one or more vectors from the analysis of the textual information;
combine one or more assessments from multiple vectors;
identify an individual or sub-group from the target group as a function of the analysis of the textual information; and
transmit to a user interface for display on the user interface or transmit to another processor the identified individual or sub-group of the target group and transmit to the user interface for display on the user interface or transmit to another processor a sentiment assessment of the identified individual or sub-group as a function of the statistical and linguistic sentiment analysis;
wherein the logged communications are a database of recorded audio voices; and wherein the system comprises a processor configured to analyze the one or more recorded audio voices for audio voice characteristics; and
wherein the one or more processors are further configured to analyze the sentiment of the individual or sub-group over a period of time.

2. The system of claim 1, wherein the data relating to a composition of a target group comprises one or more of a one to many relationship or a many to many relationship.

3. The system of claim 1, wherein the logged communications comprise one or more of a database of electronic mail messages, a database of electronic instant messages, a database of communications from a service desk, a database of communications of a forum or other meeting, and a database of transcriptions of telephone calls.

4. The system of claim 1, wherein the logged communications include a database of video data, and wherein the system comprises a processor configured to analyze a facial expression of a person in the video data.

5. The system of claim 1, wherein the voice characteristics comprise one or more of complacency, anger, stress, indifference, agreeability, displeasure, satisfaction, joy, sadness, trust, disgust, fear, surprise, and anticipation.

6. The system of claim 1, wherein the database of recorded voices comprises one or more of a database of recorded telephone calls, a database of recorded meetings, or a database of recorded presentations.

7. The system of claim 1, wherein the one or more processors configured to receive data relating to a composition of a target group, extract textual information from the logged communications, analyze the textual information using statistical and linguistic sentiment analysis techniques, identify an individual or sub-group as a function of the analysis of the textual information, display on a user interface or transmit to another processor the identified individual or sub-group and display on the user interface or transmit to another processor a sentiment assessment of the identified individual or sub-group as a function of the statistical and linguistic sentiment analysis, are further configured to execute and process the data, textual information, and the display in real or near real time.

8. The system of claim 1, wherein the one or more processors configured to analyze the textual information using statistical and linguistic sentiment analysis techniques are configured to receive a plug-in natural language statistical and/or linguistic sentiment analyzer.

9. The system of claim 1, wherein the one or more processors configured to receive data relating to a composition of a target group are further configured to identify an individual or sub-group of the target group.

10. The system of claim 1 wherein the one or more processors configured to extract textual information from the logged communications are further configured to aggregate the textual information from the logged communications.

11. A computerized process comprising:
receiving at a computer processor data relating to a composition of a target group;
receiving at the computer processor logged communications of the target group;
extracting with the computer processor textual information from the logged communications;
analyzing with the computer processor the textual information using statistical and linguistic sentiment analysis techniques;
generating one or more vectors from the analysis of the textual information;
combining one or more assessments from multiple vectors;
identifying with the computer processor an individual or sub-group from the target group as a function of the analysis of the textual information; and
causing to be displayed on a user interface or transmitting to another processor the identified individual or sub-group of the target group and causing to be displayed on the user interface or transmitting to another processor a sentiment assessment of the identified individual or sub-group as a function of the statistical and linguistic sentiment analysis;
wherein the logged communications are a database of recorded audio voices; and wherein the system comprises a processor configured to analyze the one or more recorded audio voices for audio voice characteristics; and
wherein the one or more processors are further configured to analyze the sentiment of the individual or sub-group over a period of time.

12. The computerized process of claim 11, wherein the data relating to a composition of a target group comprises one or more of a one to many relationship or a many to many relationship.

13. The computerized process of claim 11, wherein the logged communications comprise one or more of a database of electronic mail messages, a database of electronic instant messages, a database of communications from a service desk, a database of communications of a forum or other meeting, and a database of transcriptions of telephone calls.

14. The computerized process of claim 11, wherein the voice characteristics comprise one or more of complacency, anger, stress, indifference, agreeability, displeasure, satisfaction, joy, sadness, trust, disgust, fear, surprise, and anticipation.

15. The computerized process of claim 11, wherein the database of recorded voices comprises one or more of a database of recorded telephone calls, a database of recorded meetings, or a database of recorded presentations.

16. The computerized process of claim 11, wherein the logged communications include a database of video data, and comprising analyzing a facial expression of a person in the video data.

17. The computerized process of claim 11, comprising:
generating with the computer processor one or more vectors from the analysis of the textual information; and
combining with the computer processor one or more assessments from multiple vectors.

18. The computerized process of claim 11, wherein the receiving data relating to a composition of a target group, extracting textual information from the logged communications, analyzing the textual information using statistical and linguistic sentiment analysis techniques, identifying an individual or sub-group as a function of the analysis of the textual information, displaying on a user interface or transmitting to another processor the identified individual or sub-group and displaying on the user interface or transmitting to another processor a sentiment assessment of the identified individual or sub-group as a function of the statistical and linguistic sentiment analysis, are further supplemented by executing and processing the data, textual information, and the display in real or near real time.

19. The computerized process of claim 11, wherein the analyzing the textual information using statistical and linguistic sentiment analysis techniques is performed in connection with receiving a plug-in natural language statistical and/or linguistic sentiment analyzer.

20. The computerized process of claim 11, wherein the data relating to a composition of a target group are further used to identify an individual or sub-group of the target group.

21. The computerized process of claim 11, comprising aggregating the textual information from the logged communications.

22. A tangible machine-readable medium storing instructions, which, when executed by a processor, cause the processor to perform a process comprising:
receiving data relating to a composition of a target group;
receiving logged communications of the target group;
extracting textual information from the logged communications;

analyzing the textual information using statistical and linguistic sentiment analysis techniques;

generating one or more vectors from the analysis of the textual information;

combining one or more assessments from multiple vectors;

identifying an individual or sub-group from the target group as a function of the analysis of the textual information; and transmitting for displaying on a user interface or transmitting to another processor the identified individual or sub-group of the target group and transmitting for displaying on the user interface or transmitting to another processor a sentiment assessment of the identified individual or sub-group as a function of the statistical and linguistic sentiment analysis;

wherein the logged communications are a database of recorded audio voices; and wherein the system comprises a processor configured to analyze the one or more recorded audio voices for audio voice characteristics; and wherein the one or more processors are further configured to analyze the sentiment of the individual or sub-group over a period of time.

23. The tangible machine-readable medium of claim 22, wherein the logged communications include a database of video data, and comprising analyzing a facial expression of a person in the video data.

24. The tangible machine-readable medium of claim 22, comprising instructions to perform a process comprising:

generating one or more vectors from the analysis of the textual information; and combining one or more assessments from multiple vectors.

* * * * *